US011874289B2

(12) United States Patent
Itoh

(10) Patent No.: US 11,874,289 B2
(45) Date of Patent: Jan. 16, 2024

(54) SPECIMEN PROCESSING APPARATUS AND SPECIMEN PROCESSING METHOD

(71) Applicant: AOI SEIKI CO., LTD., Kumamoto (JP)

(72) Inventor: Teruaki Itoh, Kumamoto (JP)

(73) Assignee: AOI SEIKIE CO., LTD., Kumamoto (JP)

( * ) Notice: Subject to any disclaimer, the term of this patent is extended or adjusted under 35 U.S.C. 154(b) by 749 days.

(21) Appl. No.: 17/004,113

(22) Filed: Aug. 27, 2020

(65) Prior Publication Data

US 2021/0063425 A1 Mar. 4, 2021

(30) Foreign Application Priority Data

Aug. 29, 2019 (JP) ................. 2019-156737

(51) Int. Cl.
*G01N 35/00* (2006.01)
*G01N 35/04* (2006.01)
*G01N 35/10* (2006.01)

(52) U.S. Cl.
CPC ... *G01N 35/04* (2013.01); *G01N 2035/00752* (2013.01); *G01N 2035/00861* (2013.01); *G01N 2035/0406* (2013.01); *G01N 2035/1025* (2013.01)

(58) Field of Classification Search
CPC ......... G01N 35/04; G01N 2035/00752; G01N 2035/00861; G01N 2035/0406; G01N 2035/1025; G01N 35/00732; G01N 35/00584; G01N 21/25; G01N 21/251; G01N 35/00871; G01N 35/026; G01N 2035/0474; G01N 2035/00722; G01N 2035/00732

USPC ...... 73/863, 863.01, 864.21; 348/61, 86, 88, 348/143, 159
See application file for complete search history.

(56) References Cited

U.S. PATENT DOCUMENTS

| 8,211,381 | B2 | 7/2012 | Ricci et al. |
| 9,926,096 | B2 | 3/2018 | Wojdyla et al. |
| 2006/0037709 | A1 | 2/2006 | Itoh |

(Continued)

FOREIGN PATENT DOCUMENTS

| CN | 1736806 A | 2/2006 |
| CN | 105324671 B | 7/2017 |

(Continued)

OTHER PUBLICATIONS

Office Action dated Mar. 28, 2023 issued in Japanese Application No. 2019-156737 with English translation (4 pages).

(Continued)

*Primary Examiner* — Robert R Raevis
(74) *Attorney, Agent, or Firm* — Nixon & Vanderhye P.C.

(57) ABSTRACT

A specimen processing apparatus includes; a first image acquisition portion configured to capture an image of a specimen container and acquire a first image of an outer peripheral surface of the specimen container; a label removal portion configured to remove at least a part of a label attached to the outer peripheral surface of the specimen container; a second image acquisition portion configured to acquire a second image of the specimen container from which the at least part of the label is removed; and a label printing portion configured to prepare a copy label based on the first image.

4 Claims, 7 Drawing Sheets

(56) References Cited

U.S. PATENT DOCUMENTS

| | | |
|---|---|---|
| 2009/0275076 A1 | 11/2009 | Knesel et al. |
| 2011/0045521 A1 | 2/2011 | Itoh |
| 2013/0076882 A1 | 3/2013 | Itoh |
| 2016/0109350 A1 | 4/2016 | Esaki et al. |

FOREIGN PATENT DOCUMENTS

| | | | | |
|---|---|---|---|---|
| EP | 1903474 A1 * | 3/2008 | ......... | G06K 7/10722 |
| EP | 2 716 215 B1 | 11/2015 | | |
| JP | H06-102278 | 4/1994 | | |
| JP | 2005-17219 A | 1/2005 | | |
| JP | 2005017219 A * | 1/2005 | .......... | B01L 3/50215 |
| JP | 2006-106455 | 4/2006 | | |
| JP | 2007-510898 | 4/2007 | | |
| JP | 4152650 B2 * | 9/2008 | | |
| JP | 2011-064660 | 3/2011 | | |
| JP | 5481516 B2 * | 4/2014 | ............. | G01N 35/04 |
| JP | 2018-047943 | 3/2018 | | |
| JP | 2018-136329 | 8/2018 | | |

OTHER PUBLICATIONS

Office Action dated Jun. 7, 2021 issued in Taiwanese Application No. 109129087 with English translation (9 pages).
Search Report issued in EP Appln. No. 201921491 dated Mar. 3, 2021.

* cited by examiner

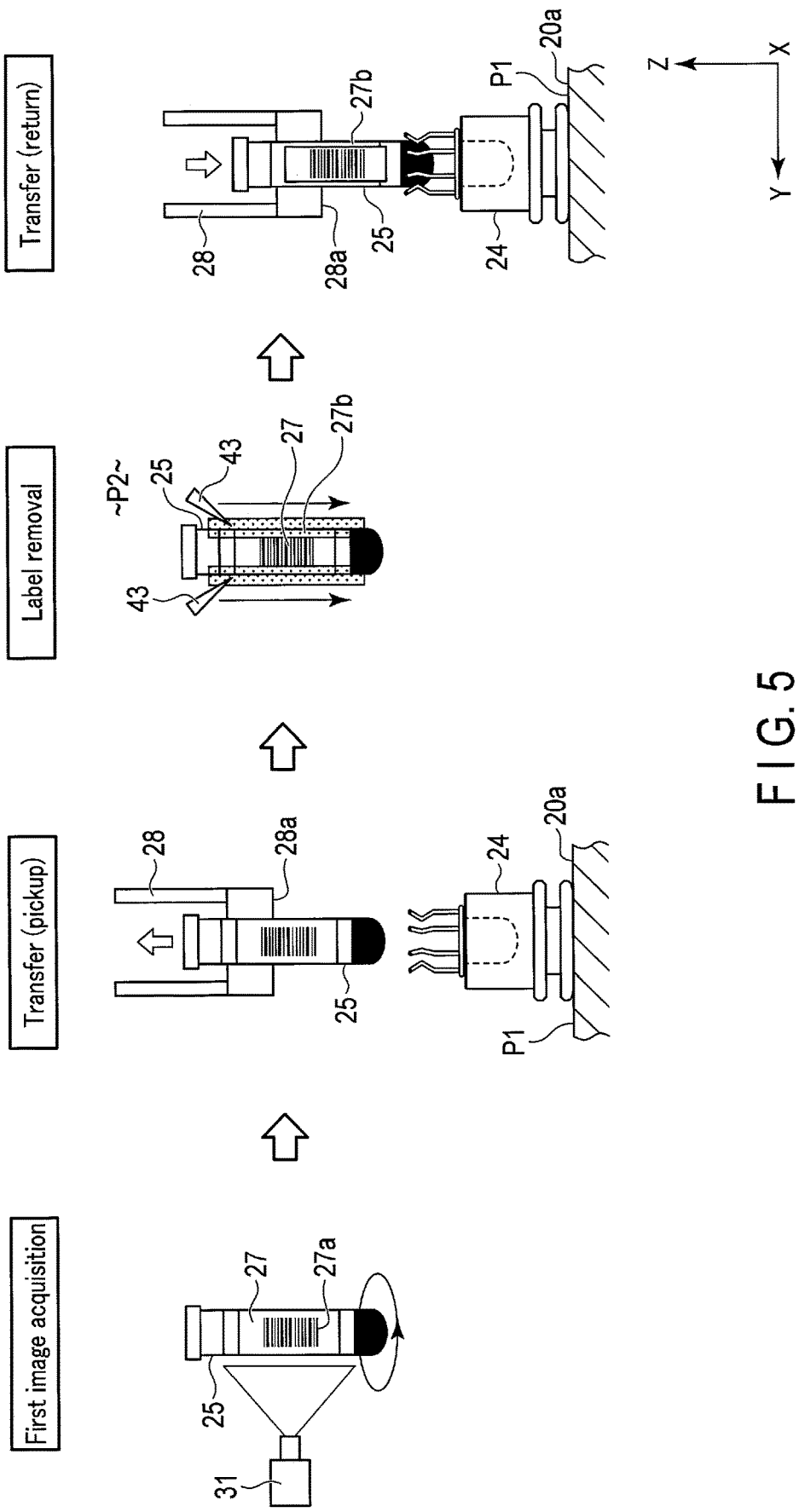
F I G. 5

SPECIMEN PROCESSING APPARATUS AND SPECIMEN PROCESSING METHOD

CROSS-REFERENCE TO RELATED APPLICATIONS

This application is based upon and claims the benefit of priority from the prior Japanese Patent Application No. 2019-156737, filed Aug. 29, 2019 the entire contents of which are incorporated herein by reference.

FIELD

The present invention relates generally to a specimen processing apparatus and a specimen processing method.

BACKGROUND

As preprocessing of processing for various kinds of blood tests such as biochemical analyses, for example, an image of a specimen container is acquired and a condition of the specimen before a test is detected based on the image. For example, the specimen container is made of transparent material, such as glass. In general, a label indicating information on the specimen, such as identification information, is attached to an outer peripheral surface of the specimen container. Therefore, the label may be removed before an image of the specimen container is captured, for example, as disclosed in Jpn. Pat. Appln. KOKAI Publication No. 2011-64660.

SUMMARY

According to an aspect of the invention, a specimen processing apparatus comprises; a first image acquisition portion configured to capture an image of a specimen container and acquire a first image of an outer peripheral surface of the specimen container; a label removal portion configured to remove at least a part of a label attached to the outer peripheral surface of the specimen container;
 a second image acquisition portion configured to acquire a second image of the specimen container from which the at least part of the label is removed; and
 a label printing portion configured to prepare a copy label based on the first image.

According to another aspect of the invention, the specimen processing apparatus further comprises; a conveyance device configured to transfer the specimen container along a conveyance path; a label attaching portion configured to attach the copy label to the specimen container.

According to another aspect of the invention, the copy label includes at least part of information corresponding to the part removed from the label.

Another aspect of the invention is a specimen processing method comprising; capturing an image of a specimen container containing a specimen, and acquiring a first image of an outer peripheral surface of the specimen container; removing at least a part of a label attached to the outer peripheral surface of the specimen container after acquiring the first image; acquiring a second image of the specimen container from which at least the part of the label is removed; detecting specimen information from the second image; preparing a copy label based on the first image; and after acquiring the second image, attaching the copy label to the outer peripheral surface of the specimen container from which the at least part of the label has been removed.

According to another aspect of the invention, the specimen processing method further comprises; before a biochemical test of the specimen, detecting information on a color or gray scale of the specimen from the second image, thereby detecting specimen information of at least one of chyle, hemolyzed blood, fibrin, or a liquid phase of the specimen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

FIG. 5 is an explanatory view showing a specimen processing apparatus and a specimen processing method according to another embodiment;

DETAILED DESCRIPTION

First Embodiment

Figure 1:
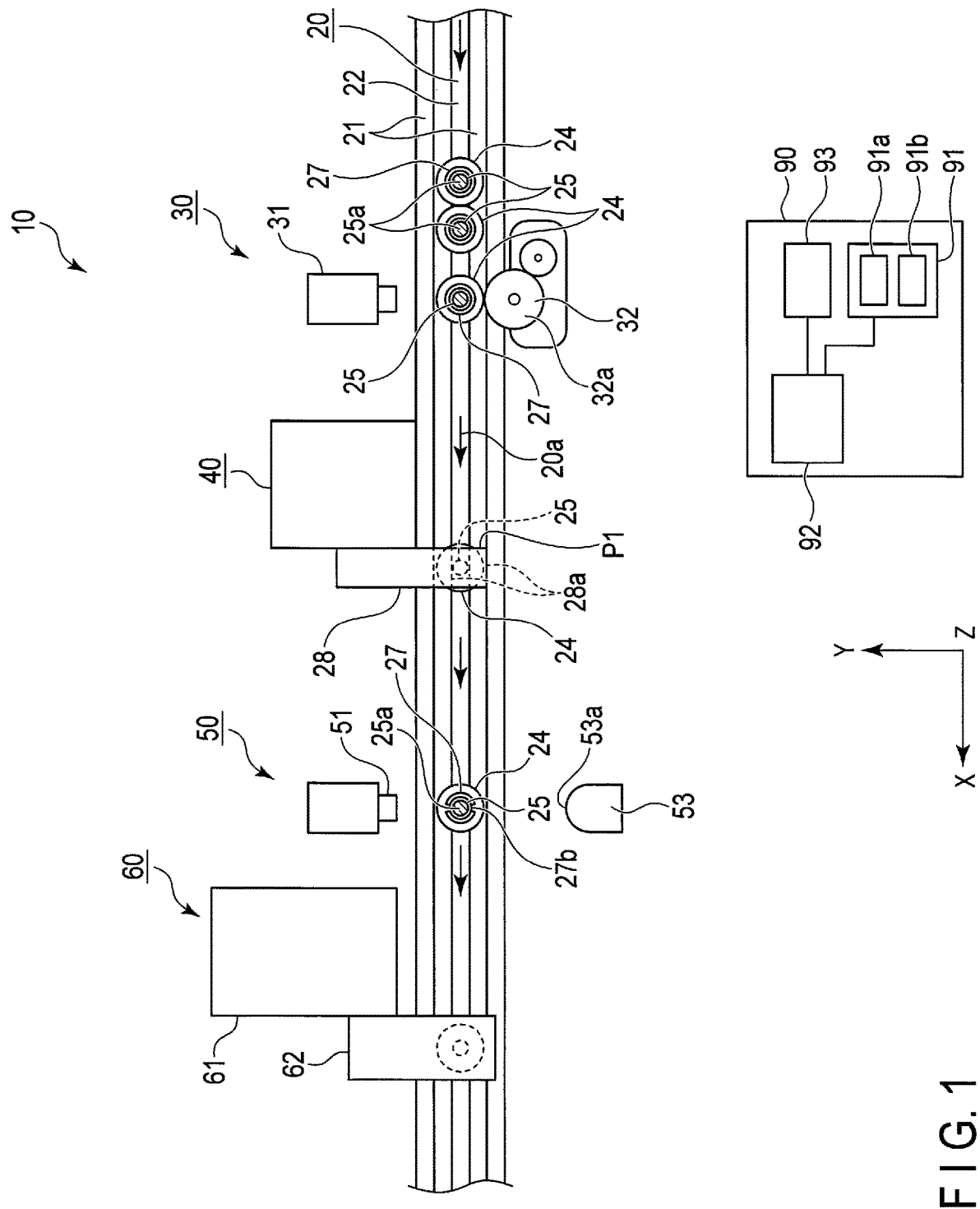
FIG. 1 is a plan view of a specimen processing apparatus according to a first embodiment.
Figure 2:
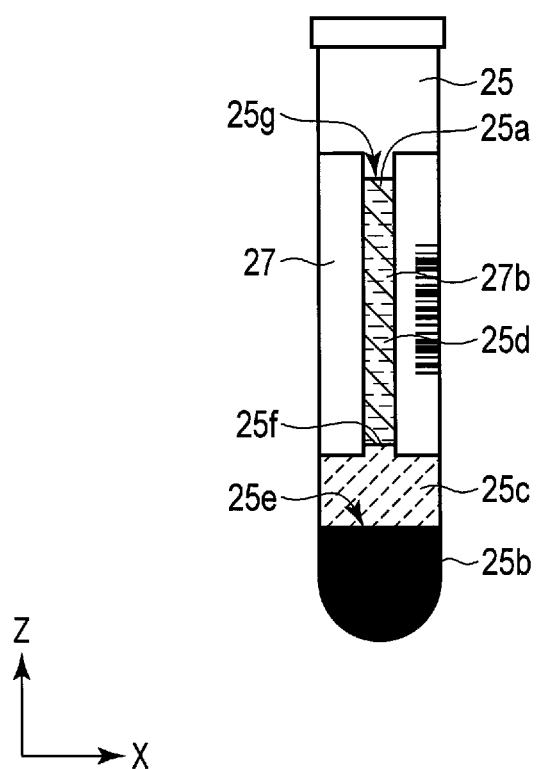
FIG. 2 is an explanatory view showing a specimen container, which is a test target of the specimen processing apparatus.
Figure 3:
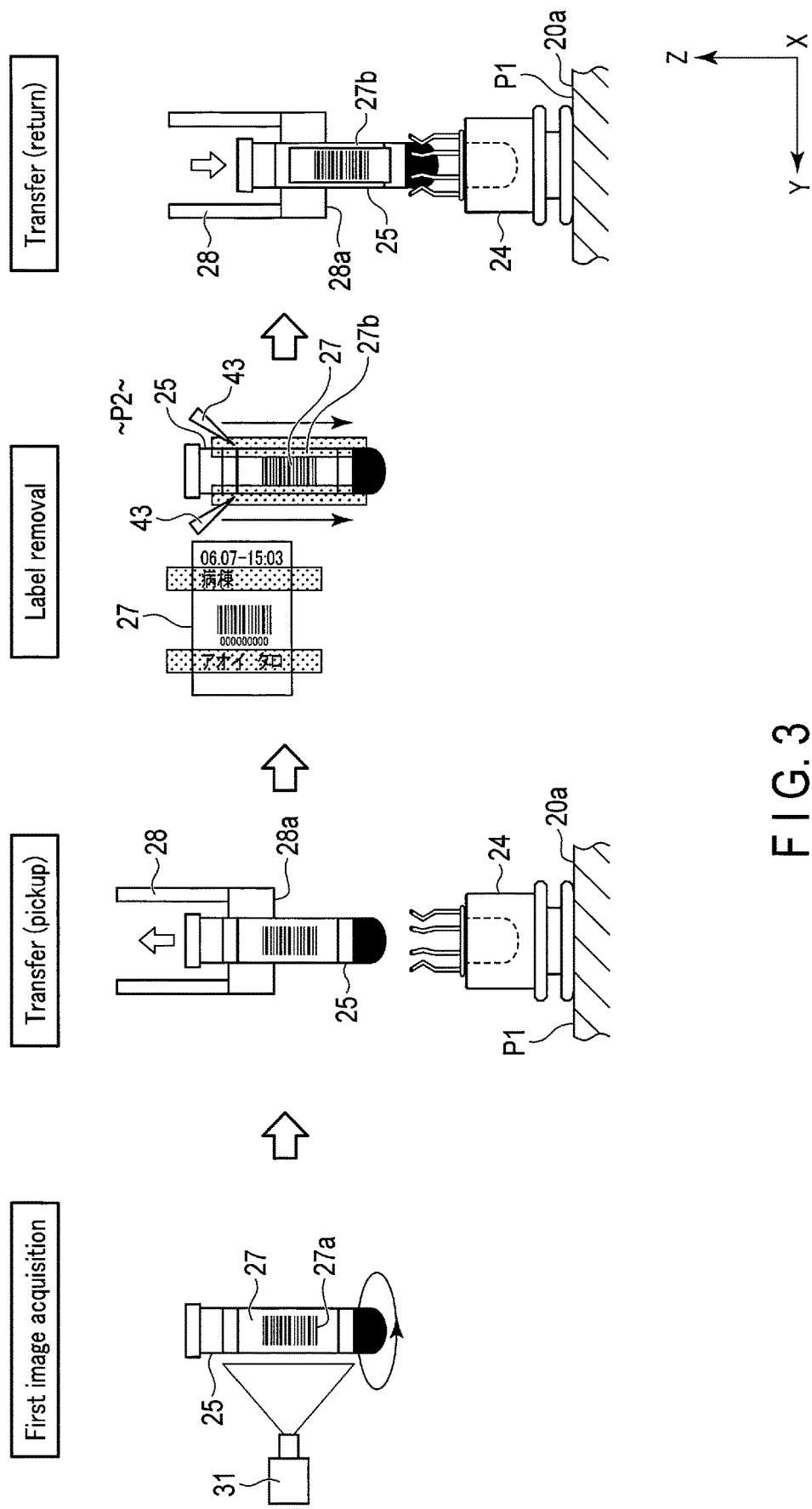
FIG. 3 is an explanatory view showing the specimen processing apparatus and a specimen processing method.
Figure 4:
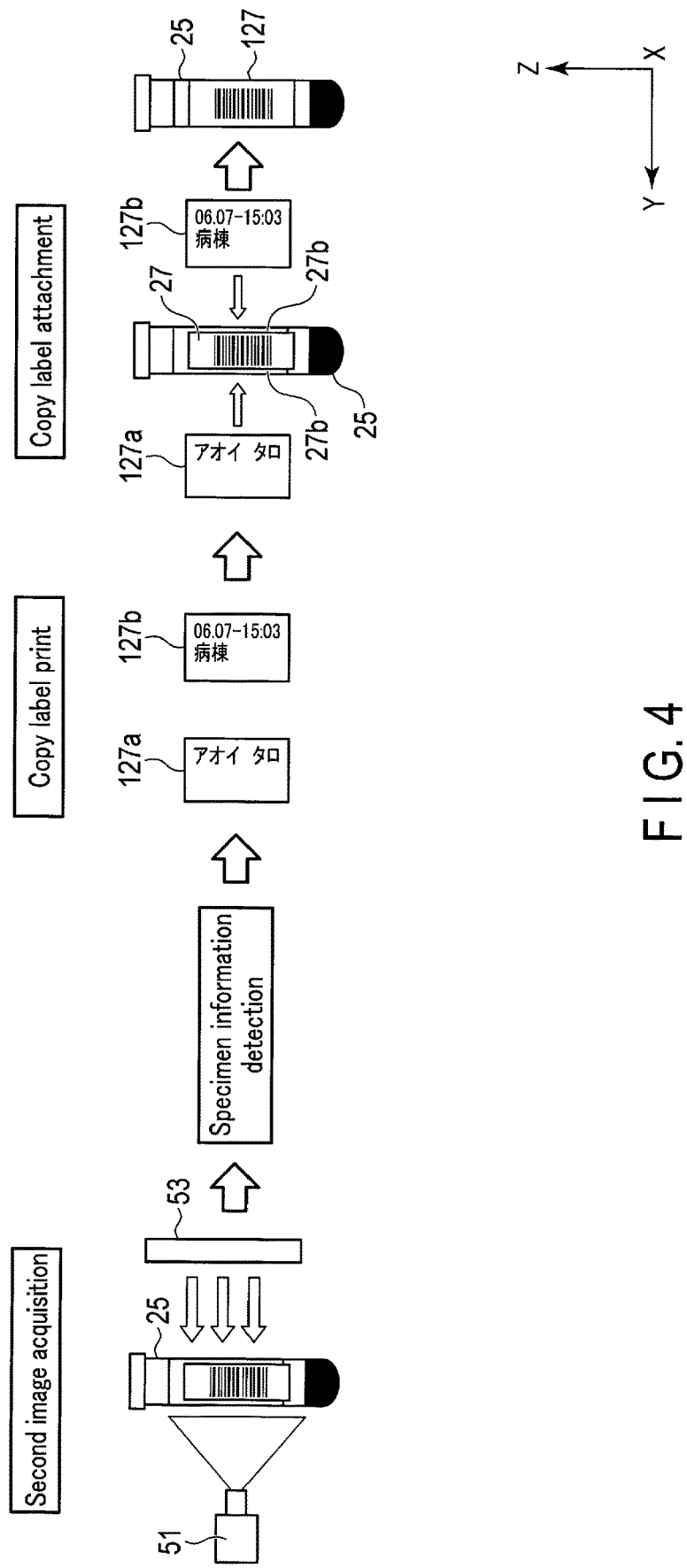
FIG. 4 is an explanatory view showing the specimen processing apparatus and the specimen processing method.

Embodiments of a specimen processing apparatus and a specimen processing method of the present invention will be described with reference to the drawings. FIG. 1 is a plan view showing a configuration of a specimen processing apparatus according to the first embodiment of the present invention. FIG. 2 is an explanatory view showing an appearance of a specimen container. FIG. 3 and FIG. 4 are explanatory views showing the specimen processing apparatus and a specimen processing method of the first embodiment. In the drawings, arrows X, Y, and Z respectively represent three directions perpendicular to one another: an X axis corresponds to a conveyance direction through the conveyance path; a Y axis corresponds to a width direction of the conveyance path, and a Z axis corresponds to a vertical direction.

The specimen processing apparatus 10 is a preprocessing apparatus which detects a condition of a specimen in advance before analyzing the specimen. The specimen processing apparatus 10 includes an apparatus main body, a conveyance device 20, a first image capture device 30 as a first image acquisition portion, a label peeling device 40 as a label removal portion, a second image capture device 50 as a second image acquisition portion, a label supply device 60, and a data processing unit 90 including various processing circuits.

The conveyance device 20 conveys a specimen container 25 along a predetermined conveyance path 20a and is constituted of a conveyor-type holder conveyance mechanism, for example, provided above the apparatus main body. The conveyance device 20 specifically includes a pair of guide rails 21, a conveyor belt 22, and a belt feed mechanism. The paired guide rails 21 are disposed with a predetermined width along the conveyance path 20a extending in the X axis direction in FIG. 1.

The conveyor belt 22 is arranged between the guide rails 21 along the conveyance path 20a. The belt feed mechanism is a conveyor roller connected to a driving source such as a motor, and rotationally drives the conveyor belt 22 on the rear side thereof to feed the conveyor belt 22.

The conveyance device 20 conveys a holder 24 holding the specimen container 25 along the conveyance path 20a by feed motion of the conveyor belt 22. By means of various processing devices disposed along the conveyance path 20a, the specimen container 25 or a specimen 25a is subjected to various processing.

The conveyance device 20 is also provided with a transfer mechanism 28. The transfer mechanism 28 includes, for example, a robot arm 28a with a grip mechanism that is openable and closable, and performs transfer processing under the control of a control unit 92. In the transfer processing, the specimen container 25 held by the holder 24 is picked up, transferred to a processing position of each unit and processed in the unit, and then returned to the conveyance path 20a. For example, according to this embodiment, the specimen container is moved between a pickup position P1, which is between the first image capture device 30 and the second image capture device 50, and a peeling position P2 of the label peeling device 40.

The holder 24 holding the specimen container 25 is supported in an upright state between the pair of guide rails 21, and conveyed as the conveyor belt 22 moves. The specimen container 25 is, for example, a test tube 25 formed of a transparent glass cylindrical body, an upper end thereof being open and a lower end being closed to store a specimen such as blood serum inside. A label 27 is attached to an outer peripheral side surface of the specimen container 25 by a bond or adhesive. The label 27 shows a bar code or character representing various kinds of indication information such as identification information of the specimen 25a. The indication information includes, for example, a name or a hospital ward representing belongingness of the specimen, various numbers, etc.

The specimen 25a in the specimen container 25 is separated into a blood clot layer 25b, a separating medium (silicone) layer 25c, and a blood serum layer 25d, and the three layers are arranged sequentially from the lower side in the order named. A first interface 25e is formed between the blood clot layer 25b and the separating medium layer 25c. A second interface 25f is formed between the separating medium layer 25c and the blood serum layer 25d. A specimen liquid surface 25g is formed on the blood serum layer 25d.

The first image capture device 30 includes a camera 31 disposed on a side portion of the conveyance path 20a, and a rotation device 32 disposed on a side portion opposite to the camera 31. While rotating the specimen container 25 with the conveyance device 20, the first image capture device 30 acquires an image of the entire label 27 attached to the side surface of the specimen container 25.

The camera 31 includes a color image sensor using, for example, a charge coupled device (CCD) or a complementary MOS (CMOS). The camera 31 operates under the control of the data processing unit 90, captures an image sideways of the specimen container 25, and outputs the captured image data to the data processing unit 90.

The rotation device 32 includes a rotation body 32a that rotates in a state of being in contact with or engaged with the peripheral surface of the holder 24 opposite from the camera 31, thereby rotating the holder 24. The rotation body is rotated at a predetermined timing in an image capturing time under the control of the data processing unit 90, thereby rotating the holder 24 to rotate the specimen container 25. The camera 31 is, for example, a line scan sensor, and captures an image while the specimen container 25 is being rotated with a constant angular speed.

The label peeling device 40 is configured to peel at least a part of the label 27, and disposed, for example, on a side portion of the conveyance path 20a. The label peeling device 40 includes a holding portion configured to hold the specimen container 25, a pair of peelers 43, and a driving source, such as a motor, configured to move the peelers 43 up and down. The paired peelers 43 are disposed on the respective side portions, facing each other, of the holding portion which holds the specimen container 25, and extend toward the specimen container 25 located at the holding portion. Each peeler 43 is formed of a plate-like member having a predetermined width and length, and has a sharp distal end. When the peelers 43 move down with the distal ends being in contact with the label 27, parts of the label 27 on the specimen container 25 are shaved off, so that a pair of front and rear window portions 27b having a predetermined width are formed.

The second image capture device 50 includes a camera 51 on one side of the conveyance path 20a downstream from the label peeling device 40, and an illuminating portion 53 on the other side of the conveyance path 20a. The illuminating portion 53 includes a light source 53a located at a position facing the camera 51 with the conveyance path 20a interposed therebetween. The light source 53a uses, for example, a light emitting diode (LED), and illuminates the specimen 25a with illumination light of white light sideways of the specimen container 25 through the window portions 27b formed as a result of the peeling process described above.

The camera 51 includes a color image sensor using, for example, a charge coupled device (CCD) or a complementary MOS (CMOS). On the side of the specimen container 25, the illumination light emitted from the illuminating portion 53 is transmitted through the specimen 25a, and the camera 51 receives the light transmitted through the window portions 27b, which were formed in the peeling process, and outputs image data of the received light to the data processing unit.

The label supply device 60 integrally includes a label printer 61 as a label printing portion configured to print information on a label and issue the label, and an attaching device 62 as a label attaching portion configured to attach the label to the specimen container. The label printer 61 includes, for example, a thermal or ink-jet printing head, configured to print a bar code or character on a label sheet as a base material. Under the control of the data processing unit 90 before the processing of peeling the label, the label printer 61 prints information based on a part or all of first image data acquired, and issues a copy label 127 after the process of printing. For example, the label printer 61 ejects the copy label 127 having adhesion through an ejection port arranged to face the outer peripheral surface of the specimen container 25 in an upright state. The label printer 61 ejects the copy label 127, for example, between a press roller of the attaching device 62 and the specimen container 25.

The attaching device 62 is provided on one side of the conveyance path 20 downstream from the second image capture device 50, and feeds and attaches the copy label 127 issued from the label printer 61 to an outer surface of the specimen container 25 flowing through the conveyance path 20a.

The attaching device 62 includes, for example, a rotation device configured to rotate the specimen container, and a press roller and an attaching roller that are arranged to face the outer peripheral surface of the specimen container 25. The press roller is arranged in proximity to the ejection port of the label printer 61, and moved toward the specimen container 25, thereby pressing the copy label 27 supplied to a position between the specimen container 25 and the press roller to the specimen container 25. The attaching roller is arranged to face the outer peripheral surface of the specimen container 25, and moved toward the specimen container 25, thereby pressing the copy label 127 to the specimen container 25.

The attaching device 62 presses the copy label 37 to the specimen container 25 with the press roller, and applies a pressure with the attaching roller to the specimen container 25 while axially rotating the specimen container 25 with the rotation device, thereby attaching the copy label 127 to the outer peripheral surface of the specimen container 25.

The data processing unit 90 includes an interface portion 91, the control portion 92, and a storage portion 93.

The interface portion 91 includes a camera interface 91a and an output interface 91b. The camera interface 91a has a function of receiving image data output from the cameras 31 and 51 and temporarily storing the received image data in a buffer memory. The camera interface 91a also has a function of sending an imaging control signal and a gain control signal to the cameras 31 and 51, and a function of sending an illumination ON/OFF control signal to the illuminating portion 53. The output interface 91b has a function of transmitting test data to a specimen analysis apparatus, an information terminal such as a personal computer, or a printer.

The control portion 92 includes, for example, a central processing unit (CPU) and a digital signal processor (DSP). Control processing of the control portion 92 is implemented by causing the CPU or the DSP to execute a program.

The control portion 92 prepares a copy label based on a first image. Specifically, the control portion 92 reads various information from the first image and print it on a label sheet. At this time, for example, the control portion 92 may prepare two copy label parts corresponding to two peeled parts of the label, or one copy label corresponding to the overall periphery of the container. The control portion prepares a copy label based on the first image. For example, the control portion prepares a copy label part on which all label information indicated in the image is printed, or part of the information corresponding to the peeled parts of the label.

The control portion 92 detects a test inhibitory factor, such as chyle or hemolyzed blood, based on second image data. For example, as a chyle test, the control portion 92 performs processing of converting image data to monochrome image data, and detects a gray scale level of the monochrome image data, determining a level of the chyle based on the gray scale level, and storing data indicative of the determination result as chyle test data in association with identification information (ID information) of the specimen in the storage portion 93. In the chyle or hemolyzed blood test, the obtained image may be corrected.

As a hemolyzed blood test, the control portion 92 performs processing of detecting a level of a color signal (RGB signal) from image data, determining a hemolyzed blood level based on the level of the color signal, and storing data indicative of the determination result as hemolyzed blood test data in association with the identification (ID information) of the specimen in the storage portion 93.

The control portion 92 supplies the imaging control signal to the cameras 31 and 51, thereby causing the cameras 31 and 51 to perform an imaging operation for the specimen. The control portion 92 also supplies the illumination ON/OFF control signal to the illuminating portion 53 in synchronism with an imaging operation of the camera 51, thereby turning on the light source 53a during an imaging operation period.

Furthermore, the control portion 92 reads detection data on chyle or hemolyzed blood about each specimen from the storage portion 93 along with the specimen ID, each time the chyle or hemolyzed blood test for the specimen is completed, or at the timing when the chyle or hemolyzed blood test of a group of a scheduled number of specimens is completed. Then, with the read detection data on the chyle or hemolyzed blood associated with the specimen ID, the control portion 92 performs processing of transmitting the data through the output interface 91b to the specimen analysis apparatus, the information terminal, etc. For example, the control portion 92 controls subsequent processing based on the detected data on chyle or hemolyzed blood. As the subsequent processing, the control portion 92 performs, for example, sortation process for removing a specimen container having a test inhibitory factor from the conveyance path 20a.

The storage portion 93 uses a hard disk or a NAND flash memory as a storage medium, and is used to store data indicative of test results described later.

Next, the specimen processing method performed by the specimen processing apparatus configured as described above will be described in line with the processing procedure of the data processing unit 90 with reference to FIG. 3 and FIG. 4.

The specimen processing method according to the present embodiment includes, before a biochemical test of the specimen in the analysis apparatus, for example, detecting information on a color or gray scale of the specimen from an image of the specimen, thereby detecting specimen information of at least one of chyle, hemolyzed blood, fibrin, or a liquid phase.

The specimen processing method includes a first image acquiring step, a label removing step, a second image acquiring step, a specimen information detecting step, a copy label printing step, and a label attaching step.

As the first image acquiring step, the data processing unit 90 captures an image of the specimen container and acquires a first image, which is an image of an outer peripheral surface of the specimen container before the label is peeled. Specifically, a camera control signal is supplied from the camera interface 91a to the camera 31, and the camera 31 captures an image of the specimen. The first image data is sent from the camera 31 to the camera interface 91a, and temporarily stored. The first image data includes an image of the overall label 27.

After acquiring the first image, the data processing unit 90 removes at least a part of the label attached to the outer peripheral surface of the specimen container 25 as the label removing step. Specifically, two parts to be peeled from the label 27 are specified in the first image. Then, the specimen container 25 is rotated to locate the parts to be removed to up-and-down paths or the peelers 43, and the peelers 43 are moved up and down, thereby removing the parts specified to be peeled from the label. For example, the parts to be peeled are determined to positions with reference to the label bar code, so that the bar code is located at a central portion between the parts to be peeled.

In the second image acquiring step, the data processing unit 90 acquires a second image of the specimen container from which parts of the label have been removed. Specifically, the illumination ON control signal is supplied from the camera interface 91*a* to the illuminating portion 53, so that the light source 53*a* of the illuminating portion 53 is turned on. Furthermore, a camera control signal is supplied from the camera interface 91*a* to the camera 51, and the camera 51 captures an image of the specimen. The light transmitted through the specimen is captured by the camera 51, and the image data is sent from the camera 51 to the camera interface 91*a*, and temporarily stored. The second image is an image of the specimen container including at least a partly peeled part of the label, i.e., at least a part of the transparent specimen container exposed through the peeled part of the label. In other words, since the second image includes an appearance of the specimen inside the container viewed through the peeled parts of the label, color information or gray-scale information on the specimen can be detected from the second image.

In the specimen information detecting step, the data processing unit 90 detects specimen information from the second image. Specifically, the data processing unit 90 reads the second image data temporarily stored in the camera interface 91*a*. From the read second image data, the data processing unit 90 detects the gray-scale information or signal levels of R, G, and B signals from the read second image data, and determines a level of the chyle or hemolyzed blood, presence or absence of an impurity such as fibrin, and a level of each liquid phase. The data indicative of the obtained determination result is stored in the storage portion 93 in association with the identification information (ID) of the specimen.

The data processing unit 90, in the copy label printing step, prepares a copy label based on the first image. Specifically, the data processing unit 90 prints on a label sheet, indication information of the parts to be peeled specified in the label removing step, so that a copy label 127 including one or more label parts is prepared. In the example shown in FIG. 4, for example, two copy label parts 127*a* and 127*b* corresponding to the two peeled parts are prepared and issued as the copy label 127.

Furthermore, after the second image is acquired, in the label attaching step, the data processing unit 90 drives the attaching device 62 to attach the copy label parts 127*a* and 127*b* to areas of the outer peripheral surface of the specimen container 25 including the window portion 27*b*, from which the label has been partially removed.

According to the specimen processing apparatus of the present embodiment, an image of the specimen container can be acquired, while the indication information is maintained. In other words, if the label is peeled before the second image capturing step for acquiring information on the specimen 25*a*, a copy label is prepared based on information of the appearance captured before the peeling, thereby ensuring the information indicated in the label 27 and maintaining the identification function.

Furthermore, parts of the label 27 at opposing two portions are peeled, and light is emitted sideways from the rear side, namely, the side opposite to the camera 51, thereby detecting the color information inside the specimen container 25 with a high accuracy.

The present invention is not limited to the embodiment described above. For example, the specific method for acquiring image data, the kind of specimens, the configuration of the specimen test apparatus, the test processing sequences, and the details of the test processing can be variously modified without departing from the spirit of the present invention. For example, image capturing can be performed a plurality of times with different image-capturing conditions or detecting conditions, and information can be detected from a plurality of kinds of images. In the embodiment described above, for example, image capturing is performed while the specimen container is rotated with a constant angular speed using a line scan sensor to acquire a first image of the overall periphery of the specimen container. However, the present invention is not limited to this example. For example, images of the specimen container can be acquired from a plurality of directions, using a CCD camera, by repeatedly rotating the specimen container at a predetermined angle and capturing an image. In the case of capturing a plurality of images with a CCD camera or the like, imaging and rotation may be alternately performed to acquire a plurality of images.

Figure 6:
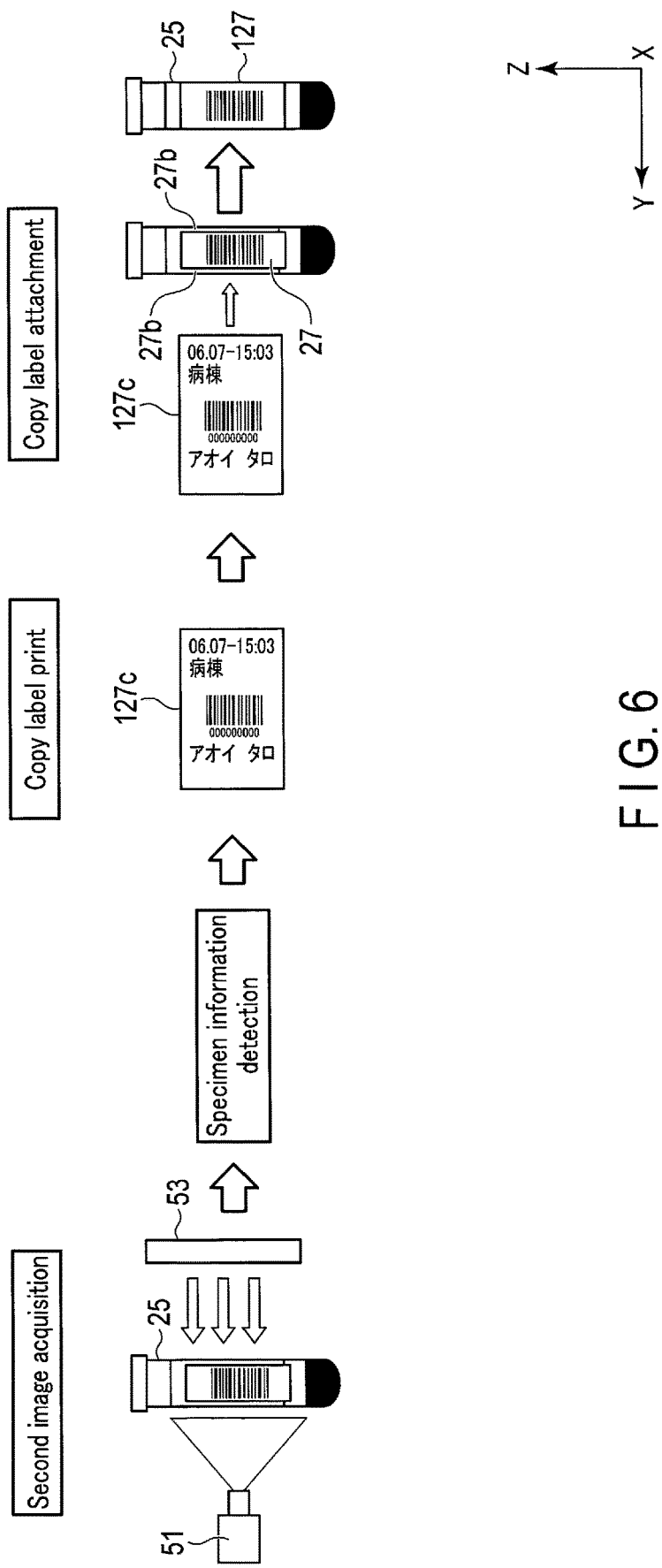
FIG. 6 is an explanatory view showing the specimen processing apparatus and a specimen processing method according to the embodiment shown in FIG. 5.

Furthermore, in the embodiment described above, for example, the two copy label parts 127*a* and 127*b* corresponding to the two peeled parts of the label 27 are prepared, and the label parts 127*a* and 127*b* are attached to the two peeled parts. However, the present invention is not limited to this example. As a specimen processing method according to another embodiment, for example, as shown in FIG. 5 and FIG. 6, a copy label 127*c* corresponding to the overall label including information on both the peeled parts and remaining parts may be prepared. In this case, the copy label 127*c* can be wrapped around and attached to the partly peeled label on the outer peripheral surface of the specimen container, so that it is unnecessary to adjust the attachment position of the copy label.

Furthermore, in the embodiment described above, for example, the specimen container is transferred from the conveyance path 20*a* to the label peeling device 40 by the transfer mechanism 28, and returned to the conveyance path 20*a* after the label peeling processing. However, the present invention is not limited to this example. The peeling processing may be performed, for example, on the conveyance path 20*a*. According to another embodiment, a specimen processing apparatus 10A shown in FIG. 7 includes a label peeling device 140 that includes paired peelers 43 disposed on the respective side portions of the conveyance path 20*a*, and a driving source, such as a motor, configured to move the peelers 43 up and down. The paired peelers 43 are disposed on the respective side portions, facing each other, of the conveyance path 20*a*, and extend toward the conveyance path 20*a*. Each peeler 43 is formed of a plate-like member having a predetermined width and length, and has a sharp distal end. When the peelers 43 move down with the distal ends being in contact with the label 27, parts of the label 27 on the specimen container 25 are shaved off, so that a pair of front and rear window portions 27*b* having a predetermined width are formed.

The configuration of the peelers 43 is not limited to the embodiment described above. For example, to remove the label 27 more easily, the processing apparatus may be provided with a heater to heat the peelers 43 or a vibrator that vibrate the peelers 43. Furthermore, the number of peelers 43 and the positions and movable range thereof are not limited to those of the embodiment described above. The peeled part of the label 27 is not limited to be of the entire length of the label in the axial direction. For example, only a part of the length in the axial direction may be removed, or the entire label 27 may be peeled.

The rotation device 32 is not limited to the configuration of the embodiment described above that rotates the holder 24. For example, the rotation device 32 may be configured to rotate only the specimen container 25, depending on the configuration or relative position of the holder 24 and the specimen container 25.

The label attaching device 62 is not limited to that of the embodiment described above which is provided on a side portion of the conveyance path 20*a* and successively attaches the label to the specimen containers being conveyed. For example, the label attaching device 62 may be configured to hold and pick up the specimen container 25 by the transfer mechanism 28 in the conveyance device 20, transfer the specimen container 25 to an attachment processing position, and then return it to the conveyance path 20*a* after the processing.

Figure 7:
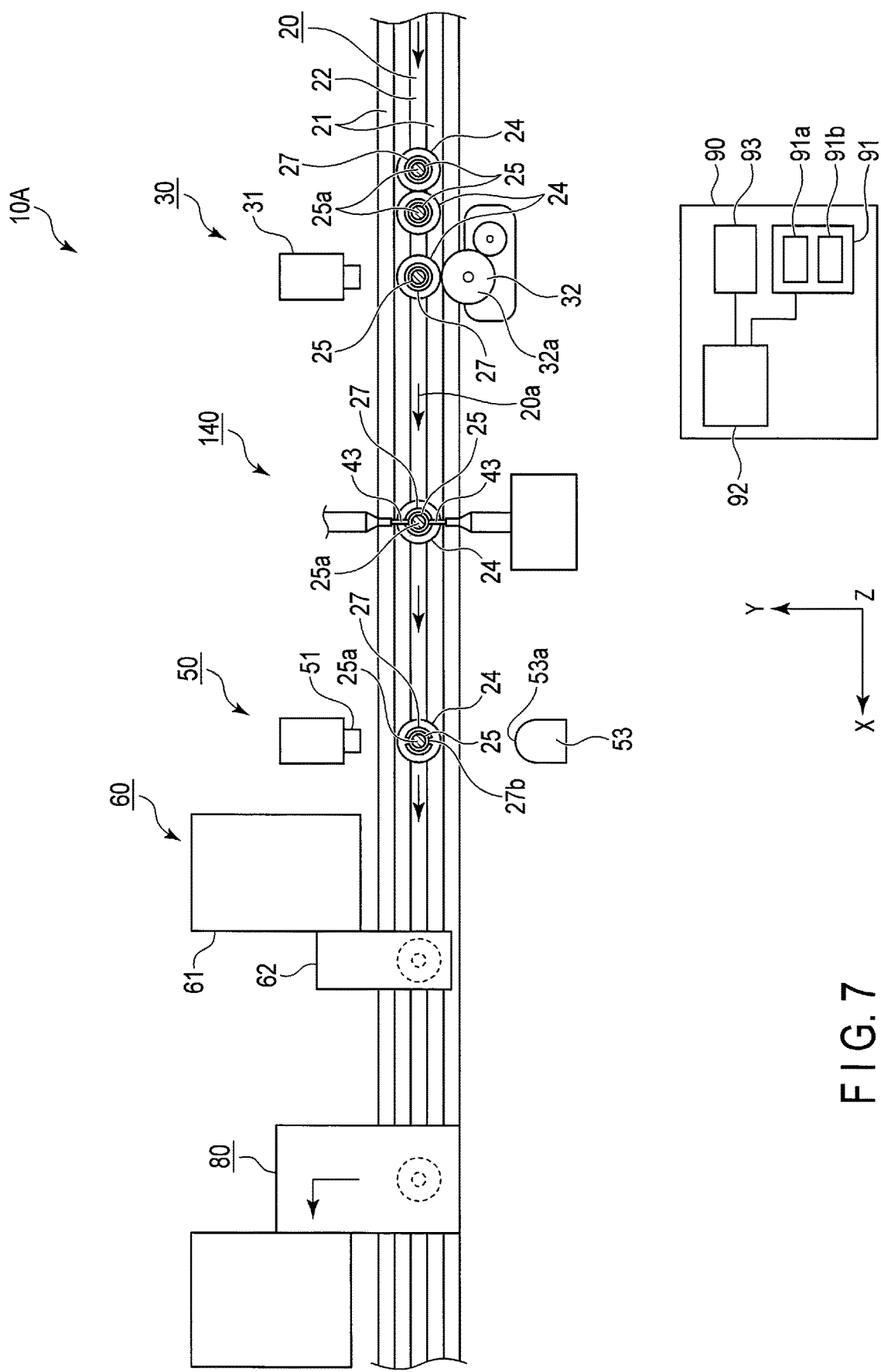
FIG. 7 is an explanatory view showing the specimen processing apparatus and a specimen processing method according to another embodiment.

According to still another embodiment, the specimen processing apparatus 10A shown in FIG. 7 may include a processing apparatus 80 for subsequent processing, such as sortation or analysis processing, on the downstream side of the label supply device 60 along the conveyance path 20*a*. For example, the processing apparatus 80, such as a sortation apparatus or an analyzing apparatus, performs sorting or analysis processing based on information acquired from the second image. These embodiments can also provide a specimen processing apparatus and a specimen processing method that can produce an image of a specimen container, while maintaining indication information by preparing a copy label from the first image before label peeling.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A specimen processing apparatus comprising:
   a conveyance device configured to transfer a specimen container along a conveyance path;
   a first image acquisition device configured to capture an image of a specimen container comprising a label attached to the outer periphery of the specimen container and acquire a first image of the entire label;
   a label removal device configured to remove a least part of the label attached to the outer peripheral surface of the specimen container;
   a second image acquisition device configured to acquire a second image of the specimen container from which the at least part of the label is removed;
   a label printer configured to prepare a copy label based on the first image;
   an attaching device configured to attach the copy label to the outer peripheral surface of the specimen container from which the at least part of the label has been removed; and
   a data processing unit including a processing circuit and configured to:
      control the conveyance device to transfer the specimen container along the conveyance path;
      control the first image acquisition device to capture the image of the specimen container comprising the label attached to the outer periphery of the specimen container and acquire the first image of the entire label;
      control the label removal device to remove at least the part of the label attached to the outer peripheral surface of the specimen container after acquiring the first image;
      control the second image acquisition device to acquire the second image of the specimen container from which the at least part of the label is removed and detect specimen information from the second image;
      control the label printer to print the copy label based on the first image; and
      control the attaching device to attach the copy label to the outer peripheral surface of the specimen container from which the at least part of the label has been removed,
   wherein the first image acquisition device, the label removal device, the second image acquisition device, the label printer, and the attaching device are arranged along the conveyance device.

2. The specimen processing apparatus according to claim 1, wherein the copy label includes at least part of information corresponding to the part removed from the label.

3. A specimen processing method comprising:
   capturing an image of a specimen container containing a specimen, and acquiring a first image of an outer peripheral surface of the specimen container;
   removing at least part of a label attached to the outer peripheral surface of the specimen container after acquiring the first image;
   acquiring a second image of the specimen container from which at least the part of the label is removed;
   detecting specimen information from the second image;
   preparing a copy label based on the first image; and
   after acquiring the second image, attaching the copy label to the outer peripheral surface of the specimen container from which the at least part of the label has been removed.

4. The specimen processing method according to claim 3, further comprising
   before a biochemical test of the specimen, detecting information on a color or gray scale of the specimen from the second image, thereby detecting specimen information of at least one of chyle, hemolyzed blood, fibrin, or a liquid phase of the specimen.

\* \* \* \* \*

UNITED STATES PATENT AND TRADEMARK OFFICE
CERTIFICATE OF CORRECTION

PATENT NO. : 11,874,289 B2
APPLICATION NO. : 17/004113
DATED : January 16, 2024
INVENTOR(S) : Teruaki Itoh It is certified that error appears in the above-identified patent and that said Letters Patent is hereby corrected as shown below:

On the Title Page

Item (71) the Applicant's name is listed as "AOI SEIKIE CO., LTD.", it should be – AOI SEIKI CO., LTD. –

Signed and Sealed this
Thirteenth Day of August, 2024

Katherine Kelly Vidal
*Director of the United States Patent and Trademark Office*